March 24, 1931.    R. C. HOFFMAN    1,797,579
MOTOR VEHICLE
Filed Sept. 24, 1928    2 Sheets-Sheet 1

INVENTOR
ROSCOE C. HOFFMAN.
Harness, Dickey & Pierce
ATTORNEY
BY.

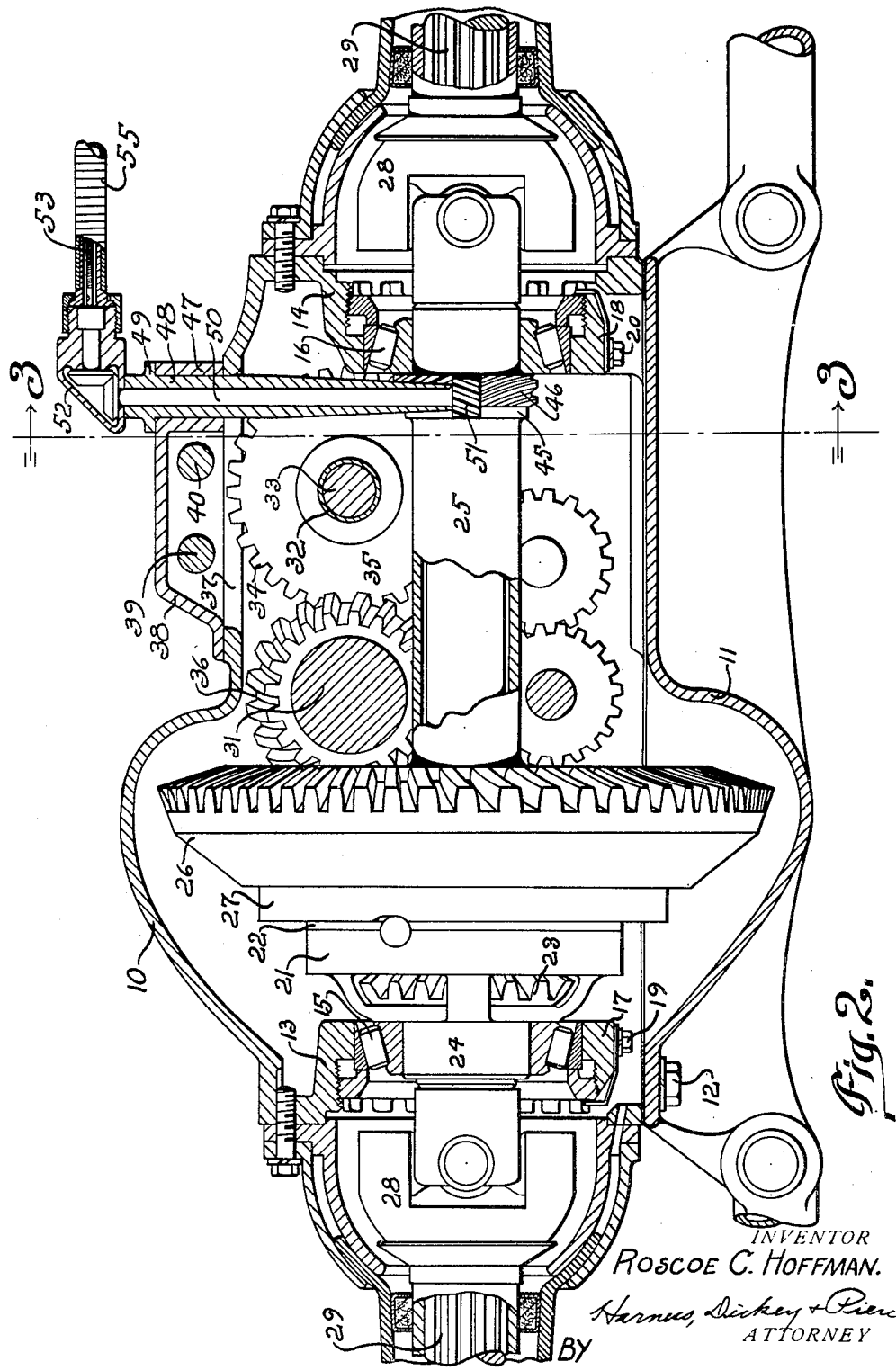

Patented Mar. 24, 1931

1,797,579

UNITED STATES PATENT OFFICE

ROSCOE C. HOFFMAN, OF DETROIT, MICHIGAN

MOTOR VEHICLE

Application filed September 24, 1928. Serial No. 307,986.

This invention relates to motor vehicles and particularly to the driving axle construction thereof, the principal object being the provision of means in connection therewith for driving a speedometer.

Another object is to provide a speedometer drive including a gear secured to rotate with the differential housing of a driving axle.

A further object is to provide a new and novel speedometer drive mechanism particularly applicable to front wheel drive motor vehicles.

The above being among the objects of the present invention, the same consists in certain features of construction and combinations of parts to be hereinafter described with reference to the accompanying drawings, and then claimed, having the above and other objects in view.
In the accompanying drawings which illustrate a suitable embodiment of the present invention, and in which like numerals refer to like parts throughout the several different views,—
Fig. 1 is a more or less diagrammatic partially broken front view of the driving axle mechanism and front wheels of a front wheel drive motor vehicle.

Fig. 2 is an enlarged fragmentary vertical sectional view taken centrally of the axle shafts of the mechanism shown in Fig. 1, and illustrating the application of my speedometer drive mechanism thereto.

Figure 1:
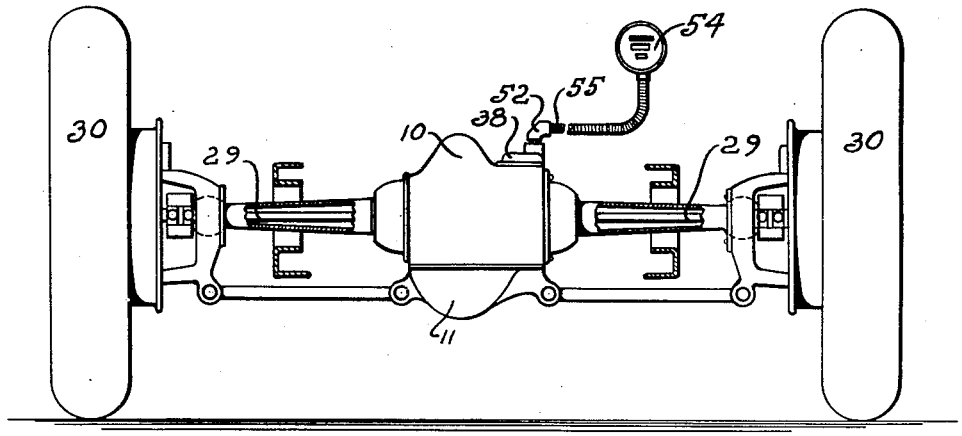
Figure 3:
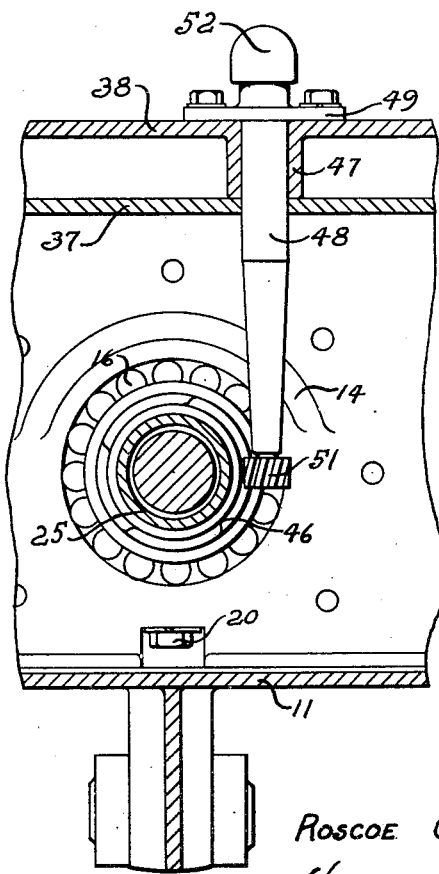
Fig. 3 is a fragmentary sectional view taken on the line 3—3 of Fig. 2.

In the accompanying drawings I show the present invention in connection with the transmission mechanism for a front wheel drive motor vehicle which, apart from the particular speedometer drive mechanism constituting the subject of the present invention, is the subject of an application for Letters Patent of the United States for improvements in power transmission mechanism filed by me on the 24th day of February, 1928, and serially numbered 256,538, it being understood, however, that the present invention is equally applicable to driving axles other than the specific type shown and described in connection with the present invention.

Briefly, the transmission mechanism which is more fully described in my patent application above referred to comprises a housing 10, the lower face of which is preferably open and normally closed by a cover member 11 secured thereto by screws such as 12 or other suitable means. Bearing yokes 13 and 14 are provided at opposite ends of the casing 10, and suitable bearings 15 and 16 are secured therein by means of caps such as 17 and 18 secured in place by screws such as 19 and 20 respectively. Rotatably supported at opposite ends in the bearings 15 and 16 is a differential housing comprising two parts 21 and 22 suitably secured together and enclosing therein the usual differential gears, only one of which is apparent as at 23. The part 21 is provided with a hub 24 which is rotatably received in the bearing 15, and portion 22 is provided with an extended sleeve-like portion 25 which extends to the opposite side of the housing 10 and is rotatably supported in the bearing 16. A ring gear 26 is secured to the flange 27 formed on the differential housing part 22. The differential gears are connected through suitable universal joints indicated generally as at 28 to the axle shafts 29 which extend outwardly therefrom and are suitably secured to the wheels 30 for driving movement therewith. Within the housing 10 is a main transmission shaft 31 which extends perpendicularly to the axial line of the differential housing and extends over the sleeve portion 25 thereof. A countershaft 32 rotatably supported on a stationary shaft 33 in parallel relationship to the main transmission shaft 31 is provided with gears such as 34 and 35 which are adapted to mesh with suitable gears such as 36 on the main transmission shaft in order to effect the desired ratio speed between the drive shaft (not shown) and the axle shafts. A suitable pinion (not shown) secured to rotate with the main transmission shaft 31 lies in meshing relationship with the ring gear 26 in order to transmit movement from the transmission shaft 31 to the differential housing and consequently the axle shafts. The upper face of the housing 10 is provided with an opening 37 closed by a cover 38, the cover 38 being provided with a pair of axially shiftable shafts 39 and 40 which are provided with suitable yokes (not shown) engaging the shiftable elements of the transmission and which are adapted to be shifted at will in order to effect the desired change in speeds of the transmission.

In accordance with the present invention I form on the sleeve 25 a collar or circumferential flange 45 and suitably secured to the sleeve 25 against relative rotation with respect thereto by suitable means (not shown) is a worm 46 which is secured against axial movement between the collar 45 and the inner race of the bearing 16. The cover 38 is provided with a vertically extending opening 47 in which is received a sleeve-like member 48 provided with a flange 49 secured against the upper face of the cover 38 by suitable means (not shown). The member 48 extends downwardly to a point approximately in horizontal alignment with the axis of the shaft 29, and rotatably mounted in the member 48 is a shaft 50 which projects below the lower end thereof and is provided below such end with a worm wheel 51 which lies in meshing relationship with the worm 46. The upper end of the shaft 50 extends above the upper end of the member 48 and is connected through a conventional type of driving head, indicated generally as 52, to the flexible shaft 53 which is adapted to extend to and be connected to a speedometer such as 54, the shaft 53 being protected by the conventional armoured cable 55. The diameter of the sleeve 48 at the point where it extends through the cover 38 is preferably greater than the diameter of the worm wheel 51 so that upon releasing the means which secures the member 48 to the cover 38, the entire assembly may be removed from the housing 10 and cover 38 without otherwise disassembling the parts. The driving head 52 may be replaced by any other type of conventional head employed for this purpose or may be dispensed with entirely, and the flexible shaft 53 secured directly to the shaft 50 as is done in some conventional constructions now on the market.

From the foregoing it will be apparent that the speedometer drive shaft 53 is driven from the shaft 50 which in turn is connected through the worm 46 and the worm wheel 51 to the differential housing so as to be driven by the rotation thereof. Inasmuch as the differential housing rotates in direct relationship with respect to the rotation of the wheels 30, it will be apparent that the rate of rotation of the speedometer drive shaft 53 bears a definite relationship with respect to the rate of rotation of the wheels 30, thus effecting a correct relationship between the speed of the vehicle and the speed of the speedometer parts. It will also be apparent that the construction is relatively economical and permits ready servicing of the same.

While I have shown the present invention in connection with a particular construction of drive mechanism for motor vehicles it will be apparent that it is equally applicable to conventional types of axle constructions in which the transmission mechanism is not combined as in the construction shown, and that it is applicable to front or rear wheel drive motor vehicles. In any case, the worm gear 46 may be secured to the differential housing and the worm wheel 51 suitably supported for meshing relationship therewith.

Formal changes may be made in the specific embodiment of the invention described without departing from the spirit or substance of the broad invention, the scope of which is commensurate with the appended claims.

What I claim is:

1. In combination with the driving axle of a motor vehicle, a housing, a pair of spaced bearings carried by said housing, a differential carrier rotatably supported between said bearings, a gear member secured to said carrier for equal rotation therewith and abutting against one of said bearings for limiting axial movement of said carrier in one direction, a speedometer drive shaft projecting into said housing, and a gear on said shaft in mesh with the first mentioned gear.

2. In combination with the driving axle of a motor vehicle, an axle housing, a pair of spaced bearings within said housing, a differential carrier rotatably supported between said bearings, a shoulder on said carrier, a gear member fixed against relative rotation to said carrier between said shoulder and one of said bearings whereby to locate said carrier in one direction relative to said housing, a speedometer drive shaft projecting into said housing, and a gear on said shaft in mesh with the first mentioned gear.

3. In combination with the driving axle of a motor vehicle, an axle housing, a pair of spaced bearings within said housing, a differential carrier rotatably supported between said bearings, a shoulder on said carrier, a gear member fixed against relative rotation to said carrier between said shoulder and one of said bearings whereby to locate said carrier in one direction relative to said housing, a sleeve member removably secured to said housing and projecting thereinto, the axis of said sleeve lying in the plane of said gear, a shaft rotatably secured against relative axial movement in said sleeve, a gear on the inner end of said shaft in mesh with the first mentioned gear, a speedometer, and a driving connection between the outer end of said shaft and said speedometer.

4. In combination with the driving axle of a motor vehicle, an axle housing, a pair of spaced bearings within said housing maintained against axial movement relative thereto, a differential carrier within said housing abutting against one of said bearings and having a relatively short sleeve portion at its corresponding end received in said bearing, said differential carrier having a relatively long sleeve portion fixed thereto on the end thereof opposite to the first mentioned end, said long sleeve portion being received in the other of said bearings, a shoulder formed on said long sleeve portion between said differential carrier and said other bearing, a gear secured against relative rotation to and encircling said long sleeve portion and spacing said shoulder from said other bearing, a shaft projecting into said housing, a gear on said shaft in mesh with the first mentioned gear, a speedometer, and means connecting said shaft and said speedometer.

ROSCOE C. HOFFMAN.